United States Patent [19]

Patton et al.

[11] Patent Number: 5,261,456
[45] Date of Patent: Nov. 16, 1993

[54] TRANSMISSION ENGAGEMENT OVERRIDE VALVE

[75] Inventors: Jon R. Patton; Robert W. Harris, both of Coffeyville, Kans.

[73] Assignee: Deere & Company, Moline, Ill.

[21] Appl. No.: 970,759

[22] Filed: Nov. 2, 1992

[51] Int. Cl.$^5$ .................... F15B 13/043; F15B 13/044
[52] U.S. Cl. ................... 137/625.64; 91/426; 137/625.65; 192/87.13
[58] Field of Search ................... 91/426, 521; 137/625.64, 625.65; 192/87.13, 87.19, 3.63

[56] References Cited

U.S. PATENT DOCUMENTS

| | | |
|---|---|---|
| 3,468,194 | 9/1969 | Horsch et al. . |
| 3,640,146 | 2/1972 | Barnes . |
| 3,709,065 | 1/1973 | Starling . |
| 3,805,837 | 4/1974 | Stampfli ................... 137/625.64 X |
| 3,863,523 | 2/1975 | Starling et al. . |
| 4,111,071 | 9/1978 | Pearce et al. . |
| 4,396,099 | 8/1983 | Shirley . |

Primary Examiner—Gerald A. Michalsky

[57] ABSTRACT

A transmission control system includes a plurality of hydraulic pressure operated control elements for engaging a gear of the transmission in response to actuation of a shift control lever having neutral and non-neutral positions, a plurality of control valves for controlling pressurization of the control elements and a pump for supplying pressurized fluid to the control valves. An engagement override system includes a switch which is coupled to the shift lever and which energizes a solenoid when the shift lever is in its neutral position and de-energizes the solenoid when the shift lever is in its non-neutral position. In a preferred embodiment, an engagement override valve includes a pilot operated valve which controls communication between the pump, a reservoir and the pressure operated control elements. The solenoid controls the pilot operated valve. The valve also includes a pilot chamber which is pressurized to move the valve to and hold the valve in a position wherein the pump is communicated with the pressure operated control elements.

10 Claims, 1 Drawing Sheet

TRANSMISSION ENGAGEMENT OVERRIDE VALVE

BACKGROUND OF THE INVENTION

This invention relates to a transmission engagement override valve for a vehicle transmission control system.

It is known to provide an engagement override valve for a vehicle transmission control system. One such known engagement override valve used in John Deere tractors is a hydraulically operated valve which is reset to allow transmission gear engagement in response to a pressure signal generated when the shift lever or a valve associated therewith is in a neutral position. For example, if the engine is started while the shift lever is still in gear, the tractor clutches will not function until the shift lever is cycled through its neutral position.

However, in an electrically controlled transmission, there may be only an electrical connection to the shift lever. It would be desirable to provide an engagement override function for use with an electronically controlled transmission.

SUMMARY OF THE INVENTION

An object of the present invention is to provide an engagement override system for a vehicle transmission control system.

Another object of the invention is to provide such an engagement override system which can not be easily defeated.

These and other objects are achieved by the present invention which provides an engagement override system for a transmission control system having a plurality of hydraulic pressure operated control elements for engaging a gear of the transmission in response to actuation of a shift control lever having neutral and non-neutral positions, a plurality of control valves for controlling pressurization of the control elements and a pump for supplying pressurized fluid to the control valves. A switch is coupled to the shift lever and energizes a solenoid when the shift lever is in its neutral position and de-energizes the solenoid when the shift lever is in its non-neutral position. A valve includes a first port connected to a pump output port, a second port connected to the plurality of control valves and a valve member movable to a first position blocking communication between the first and second ports and to a second position opening communication between the first and second ports. A spring is biased to urge the valve member to its first position. The valve also includes a pilot chamber which may be pressurized to move the valve member to and hold the valve member in the second position. The solenoid operates a pilot valve which controls communication between the pump and the pilot chamber. The solenoid opens the pilot valve when it is energized and closes the pilot valve when it is de-energized.

DETAILED DESCRIPTION

Figure 1:
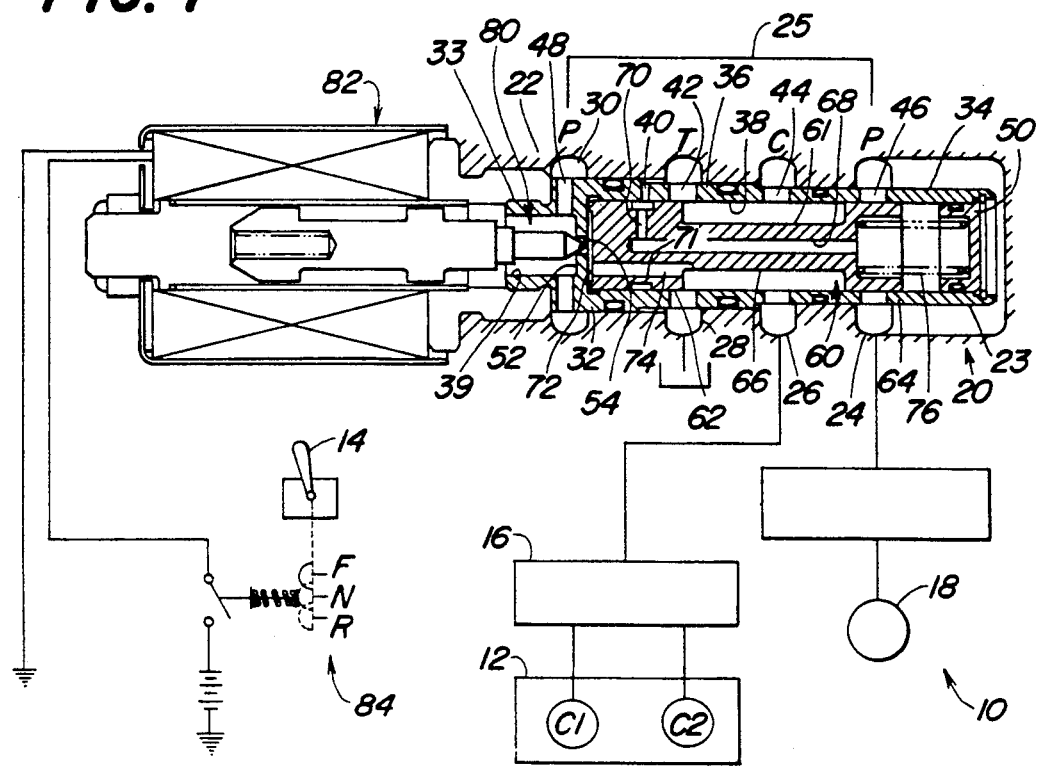
FIG. 1 is a schematic diagram of an engagement override valve according to the present invention.

Referring to FIG. 1, a transmission control system 10 includes a plurality of hydraulic pressure operated control elements C1, C2 for engaging a gear of a powershift transmission 12 in response to actuation of a shift control lever 14 having neutral and non-neutral positions. A plurality of control valves 16 controls pressurization of the control elements C1, C2 and a pump 18 supplies pressurized fluid to the control valves 16.

An engagement override valve 20 controls communication between the pump 18 and the control valves 16. Valve 20 includes a housing 22 which contains a hollow sleeve 23. Housing 22 defines a first port 24 connected to the output port of pump 18, a second port 26 connected to the control valves 16, a third port 28 connected to a reservoir, and a fourth port 30 connected to port 24 and to pump 18 via passage 25.

The sleeve 23 has a large diameter section 32 and a small diameter section 34 joined together by an intermediate diameter section 36. Section 33 projects axially from section 32. These sections surround a bore 38 and are slidably and sealingly received in corresponding bore portions in the housing 22. A bore 39 projects axially through section 33 and into section 32. Ports 40 and 42 extend radially through section 36 and communicate port 28 with the bore 38. Port 44 extends radially through section 34 and communicates port 26 with the bore 38. Port 46 extends radially through section 34 and communicates port 24 with the bore 38. Ports 48 extend radially through section 32 and communicate port 30 with the bore 39. One end of the bore 38 is sealed or closed with a plug 50. End wall 52 separates bore 38 from bore 39, and a central aperture 54 extends therebetween.

A valve member 60 is slidable in the bore 38 and includes a stem 61 and lands 62 and 64 separated by groove 66. A central axial bore 68 extends from the end of land 64, through stem 61 and part way into land 62. A radial bore 70 and groove 71 communicates bore 68 with the outer surface of land 62. End wall 52 and land 62 cooperate to enclose a pilot chamber 72 therebetween. A bore 74 extends axially through land 62 and communicated chamber 72 with the groove 66. A spring 76 is mounted between plug 50 and valve member 60 and is biased to urge the valve member 60 away from plug 50.

A pilot valve member 80 is engageable with wall 52 to open and close aperture 54. A solenoid 82 controls the movement of pilot valve member 80. A switch 84 is operatively coupled to the shift control lever 14 and connects the solenoid to a 12 volt source only when the shift lever 14 is in a neutral position.

Mode of Operation

When the shift lever 14 is out of its neutral position, the solenoid 82 will be de-energized and spring 76 will hold the valve member 60 in the illustrated position wherein port 46 is blocked and port 26 is communicated with port 28. This communicates reservoir pressure to the control valves 16 and closes communication between pump 18 and the control valves If the shift lever 14 is moved into its neutral position, the switch 84 will close to energize the solenoid 82, which will pull pilot valve member 80 away from end wall 52 to open aperture 54. Fluid will then flow from pump 18 to chamber 72 via port 24, passage 25, port 30, bore 39 and aperture 54. The pressure in chamber 72 will move valve member 60 to the right viewing FIG. 1, to a second position wherein ports 28 and 42 are blocked by land 32, and wherein pump pressure is communicated to control valves 16 via port 24, groove 66 and ports 44 and 26. With pressure now available to the control valves 16, the transmission 12 may be placed in a desired gear according to the position of the shift control lever 14. The valve member 60 will remain in this right-hand position as long as the pump 18 is supplying pressure because pump pressure will be communicated to chamber 72 via ports 24, 46, groove 66 and bore 74.

With this system, no hydraulic pressure can be transmitted to the control elements of the transmission 12 until pilot valve member 80 is moved to open aperture 54 by the solenoid 82, regardless of how the engine (not shown) is started. This will also be the case when a solenoid is shorted out across the starter (not shown) by external means such as a screw driver. In other words, the control elements of the transmission 12 cannot be activated until the shift lever 14 is placed in neutral and electrical power is supplied to the switch 84.

Figure 2:
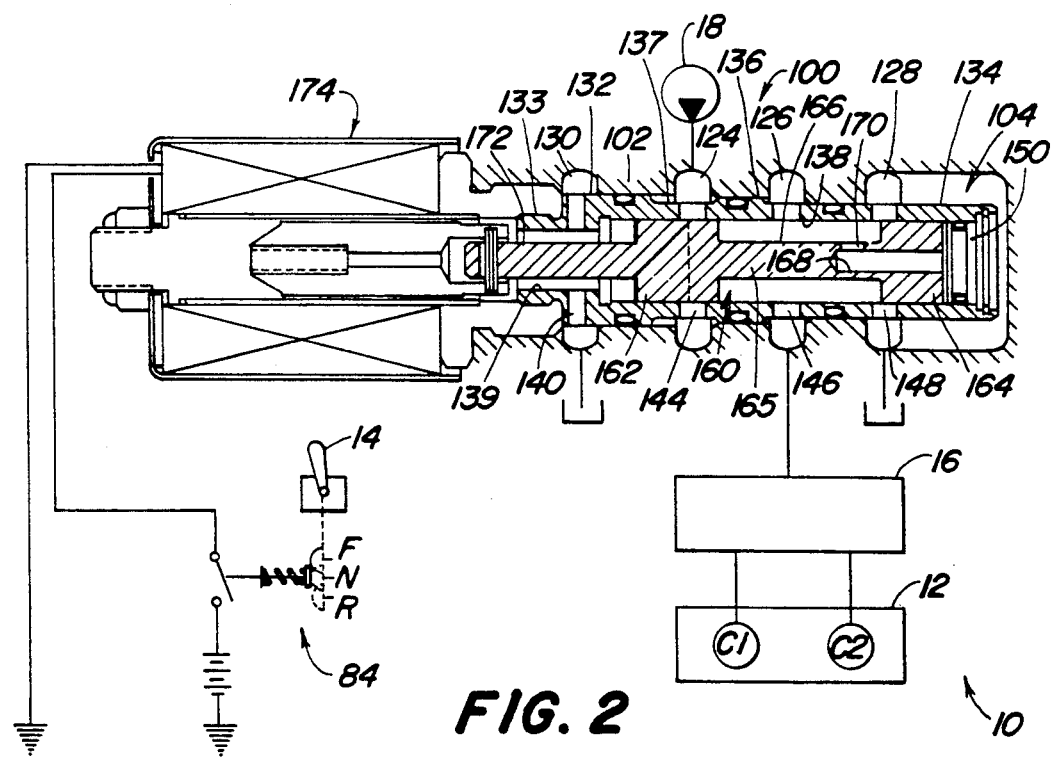
FIG. 2 is a schematic diagram of an alternate embodiment of an engagement override valve according to the present invention.

FIG. 2 illustrates an alternate embodiment of the present invention. An alternate engagement override valve 100 controls communication between the pump 18 and the control valves 16. Valve 100 includes a housing 102 which contains a hollow sleeve 104. Housing 102 and sleeve 104 cooperate to define a first port 124 connected to the output port of pump 18, a second port 126 connected to the control valves 16, a third port 128 connected to a reservoir, and a fourth port 130 connected to the reservoir.

The sleeve 104 has a large diameter section 132, a small diameter section 134, an intermediate diameter section 136 and a groove 137 separating sections 130 and 136. Section 133 projects axially from section 132. These sections surround a bore 138 and are slidably and sealingly received in corresponding bore portions in the housing 102. A bore 139 projects axially through section 133 and into section 132. A pair of ports 140 extends radially through section 132 and communicate port 130 with the bore 139. A pair of ports 144 extends radially through grooved portion 137 and communicate port 124 with the bore 138. A pair of ports 146 extends radially through section 134 and communicates port 126 with the bore 138. A pair of ports 148 extend radially through section 134 and communicate port 128 with the bore 138. One end of the bore 138 is sealed or closed with a plug 150.

A valve member 160 is slidable in the bore 138 and includes lands 162 and 164 spaced apart on a stem 165 and separated by groove 166. A central axial bore 168 extends from the end of land 164 part way into stem 165. A radial bore 170 communicates bore 168 with the outer surface of stem 165. Valve member 160 also includes a stem 172 which projects from land 162. Stem 172 is coupled to an armature of a solenoid 174. The solenoid 174 controls the movement of valve member 160. A switch 84 is operatively coupled to the shift control lever 14 and connects the solenoid to a 12 volt source only when the shift lever 14 is in a neutral position.

Mode of Operation of Alternate Embodiment

When the shift lever 14 is out of its neutral position, the solenoid 174 will be de-energized and the valve member 160 will remain in the position illustrated in FIG. 2 wherein port 124 is blocked and port 126 is communicated with port 128. This communicates reservoir pressure to the control valves 16 and closes communication between pump 18 and the control valves 16.

If the shift lever 14 is moved into its neutral position, the switch 84 will close to energize the solenoid 174, which will move valve member 160 to the left viewing FIG. 2, to a second position wherein reservoir port 128 is blocked by land 164, and wherein pump pressure is communicated to control valves 16 via port 124, port 144, groove 166 and ports 146 and 126. With pressure now available to the control valves 16, the transmission 12 may be placed in a desired gear according to the position of the shift control lever 14. The valve member 160 will remain in this second position as long as the pump 18 is supplying pressure because pump pressure will be communicated to the end of land 164 via ports 124, 144, groove 166, port 170 and bore 168.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. An engagement override system for a transmission control system having a plurality of hydraulic pressure operated control elements for engaging a gear of the transmission in response to actuation of a shift control lever having neutral and non-neutral positions, a plurality of control valves for controlling pressurization of the control elements and a pump for supplying pressurized fluid to the control valves, characterized by:

signal generating means coupled to the shift lever for generating a first signal when the shift lever is in its neutral position and for generating a second signal when the shift lever is in its non-neutral position;

a valve comprising a housing defining a first port connected to a pump output port and a second port connected to the plurality of control valves, a valve member movable to a first position wherein communication between the first and second ports is blocked and to a second position wherein communication between the first and second ports is open; and servo means coupled to the signal generating means for maintaining the valve member in the first position in response to the second signal and for moving the valve member to the second position in response to the first signal.

2. The invention of claim 1, wherein:

the housing and the valve member cooperate to form a pilot chamber which may be pressurized to move the valve member to the second position;

a spring is biased to urge the valve member to its first position;

a pilot valve controls communication between the pump and the pilot chamber; and the servo means is coupled between the signal generating means and the pilot valve, the servo means opening the pilot valve in response to the first signal and closing the pilot valve in response to the second signal.

3. The invention of claim 2, further comprising:

a pilot passage communicates pressure from the pump to the pilot chamber when the valve member is in the second position.

4. The invention of claim 2, wherein the main valve comprises:
- a housing defining a valve bore, the first port communicating the valve bore to the pump, the second port communicating the valve bore to the control valves, a reservoir port communicating the valve bore to a reservoir, and a pump port communicating the pump to the valve bore; and
- a valve member movable in the valve bore, the valve member comprising a cylindrical body with first and second lands separated by a groove, the valve member having a central axial bore extending from an end of the first land part way into the second land and a radial bore communicating the central axial bore with an outer surface of the second land, the housing and the valve member cooperating to enclose the pilot chamber therebetween, the valve member having a passage extending through the second land and communicating the pilot chamber with the groove.

5. The invention of claim 4, wherein:
the first land is movable to open and close communication between the first port and the second port.

6. The invention of claim 4, wherein:
the second land is movable to open and close communication between the second port and the reservoir port.

7. The invention of claim 1, wherein:
the valve member comprises a cylindrical stem with a first land on an end of the stem and a second land mounted on a central portion of the stem, the first and second lands cooperating to define a groove therebetween, the housing and the first land cooperating to enclose the pressure chamber therebetween, the valve member having a passage extending through the first land and communicating the pressure chamber with the groove.

8. The invention of claim 7, wherein:
the stem of the valve member extends away from the second land to a second end, the servo means being coupled to the second end of the stem.

9. The invention of claim 7, wherein:
the housing defines a reservoir port connected to a fluid reservoir, and
the first land is movable to open and close communication between the second port and the reservoir port.

10. An engagement override system for a transmission control system having a plurality of hydraulic pressure operated control elements for engaging a gear of the transmission in response to actuation of a shift control lever having neutral and non-neutral positions, a plurality of control valves for controlling pressurization of the control elements and a pump for supplying pressurized fluid to the control valves, characterized by:
signal generating means coupled to the shift lever for generating a first signal when the shift lever is in its neutral position and for generating a second signal when the shift lever is in its non-neutral position;
a main valve comprising a first port connected to a pump output port, a second port connected to the plurality of control valves, a valve member movable to a first position wherein communication between the first and second ports is blocked and to a second position wherein communication between the first and second ports is open, a spring biased to urge the valve member to its first position, a pilot chamber which may be pressurized to move the valve member to the second position;
a pilot valve for controlling communication between the pump and the pilot chamber; and
servo means coupled to the signal generating means for opening the pilot valve in response to the first signal and for closing the pilot valve in response to the second signal.

* * * * *